US012606079B2

(12) United States Patent　　　(10) Patent No.: US 12,606,079 B2
Knapp et al.　　　　　　　　　　(45) Date of Patent: Apr. 21, 2026

(54) WAGON WITH BATHROOM MODULE

(71) Applicant: Conestoga Wagon Company LLC,
Bloomington, ID (US)

(72) Inventors: Michael Knapp, Bloomington, ID
(US); Jason Olson, St. Charles, ID
(US); Richard Smart, Bloomington, ID
(US)

(73) Assignee: Conestoga Wagon Company LLC,
Bloomington, ID (US)

( * ) Notice: Subject to any disclaimer, the term of this
patent is extended or adjusted under 35
U.S.C. 154(b) by 381 days.

(21) Appl. No.: 18/376,406

(22) Filed: Oct. 3, 2023

(65) Prior Publication Data

US 2024/0109472 A1　　Apr. 4, 2024

Related U.S. Application Data

(60) Provisional application No. 63/412,879, filed on Oct.
3, 2022.

(51) Int. Cl.
　B60R 15/04　　　(2006.01)
　B60H 1/00　　　(2006.01)
　B60P 3/36　　　(2006.01)
　B60R 15/02　　　(2006.01)

(52) U.S. Cl.
　CPC ............ B60P 3/36 (2013.01); B60H 1/00207
　　(2013.01); B60R 15/02 (2013.01); B60R 15/04
　　　(2013.01); B60H 2001/00221 (2013.01)

(58) Field of Classification Search
None
See application file for complete search history.

(56) References Cited

U.S. PATENT DOCUMENTS

| | | | | |
|---|---|---|---|---|
| 3,118,187 A | * | 1/1964 | Alimanestiano | ........ B60R 15/00 |
| | | | | D25/4 |
| 3,811,462 A | * | 5/1974 | Feliz | ....................... B60R 15/00 |
| | | | | 137/355.16 |
| 5,746,473 A | * | 5/1998 | Crean | .................... B60R 15/00 |
| | | | | 296/168 |
| 5,788,320 A | * | 8/1998 | Hanemaayer | ........... B60R 15/00 |
| | | | | 296/164 |

(Continued)

FOREIGN PATENT DOCUMENTS

| | | | | |
|---|---|---|---|---|
| DE | 29701860 | * | 12/1997 | |
| KR | 102266067 B1 | * | 6/2021 | ............. B60H 3/022 |

*Primary Examiner* — Joseph D. Pape
(74) *Attorney, Agent, or Firm* — Seth Black; Black IP,
PLLC

(57) ABSTRACT

The present invention extends to wagons with a bathroom
module and standalone bathroom modules. A bathroom
module includes a water heater connected to a sink, a
shower, and a toilet. The bathroom module further includes
a protective layer on the exterior and an exhaust fan to
facilitate the management of moisture that may build up
within the bathroom module. The bathroom module can be
connected to various systems provided by a wagon, such as
water, gas, electrical, A/C, heat, and sewer systems con-
nected to external sources. Alternatively, the bathroom mod-
ule can standalone and include its own water, gas, electrical,
A/C, heat, and sewer systems connected to external sources.
Thus, when paired with a companion wagon, the bathroom
module may be installed or removed as desired.

10 Claims, 9 Drawing Sheets

(56)     References Cited

U.S. PATENT DOCUMENTS

|              |      |         |           |                |
|--------------|------|---------|-----------|----------------|
| 6,293,612    | B1 * | 9/2001  | Crean     | B60P 3/36      |
|              |      |         |           | 296/176        |
| 11,053,706   | B2 * | 7/2021  | Knapp     | B60H 1/3226    |
| 2010/0269875 | A1 * | 10/2010 | Notermann | B60R 15/02     |
|              |      |         |           | 135/96         |
| 2011/0278877 | A1 * | 11/2011 | Kim       | B60P 3/341     |
|              |      |         |           | 296/168        |

* cited by examiner

WAGON WITH BATHROOM MODULE

CROSS-REFERENCE TO RELATED APPLICATIONS

This application claims the benefit of U.S. Provisional Patent Application No. 63/412,879, entitled "WAGON WITH BATHROOM MODULE," filed Oct. 3, 2022, which is incorporated by reference herein in its entirety.

This application is also related to U.S. patent application Ser. No. 17/367,514, entitled "DOUBLE CANOPY COVERED WAGON," filed Jul. 5, 2021, which is a continuation of U.S. patent application Ser. No. 17/001,481, entitled "DOUBLE CANOPY COVERED WAGON," filed Aug. 24, 2020, now issued as U.S. Pat. No. 11,053,706, which claims the benefit of, and priority to, U.S. Provisional Patent Application No. 62/891,295, entitled "COVERED WAGON DOUBLE CANOPY," filed Aug. 24, 2019. The entire contents of the foregoing applications and issued patents are hereby expressly incorporated by reference in their entirety.

BACKGROUND

1. Background and Relevant Art

Covered wagons, a historical emblem of pioneering spirit and migration throughout the American frontier, have endured the test of time. Originally utilized as vital tools for transportation and shelter during the westward expansion, covered wagons embodied resilience and adaptability. However, it is in more recent times that these iconic wagons have witnessed a renaissance in popularity, transforming from pragmatic vehicles of necessity to sought-after sanctuaries for modern outdoor enthusiasts. With the advent of "glamping," a portmanteau of glamour and camping, the perception of covered wagons has evolved. They have seamlessly transitioned from functional historical artifacts to luxurious, comfortable retreats that allow individuals to bask in the splendors of the outdoors without compromising on comfort or convenience. This shift has breathed new life into an age-old concept, placing covered wagons at the forefront of the burgeoning trend in experiential outdoor hospitality.

One essential amenity highly coveted by individuals, especially in the realm of modern outdoor experiences, is a convenient and private bathroom facility. As individuals increasingly seek comfort and convenience while enjoying the rustic charm of covered wagons, the need for on-board facilities, such as bathrooms, becomes desirable. Traditional approaches to integrating bathrooms into covered wagons often involved fixed and permanent installations, where bathrooms were constructed as integral and permanent parts of the wagon structure. These fixed installations were built directly into the wagon's framework, thereby restricting the flexibility and adaptability of the wagon's interior layout. The permanence of these structures limited the overall design options and impeded the ability to tailor the wagon's configuration to varying user needs, hindering the potential for versatile and customizable usage.

Thus, despite the initial appeal, prior approaches to integrating bathrooms into covered wagons presents several notable challenges. First and foremost, covered wagons, by their nature, pose a unique obstacle in managing moisture and humidity levels. Moisture control becomes particularly challenging within the confines of these wagons, where it's difficult to ensure proper ventilation and humidity regulation. This environment often leads to a build-up of moisture, creating a breeding ground for mold and other potentially harmful substances, not to mention contributing to the advancing degradation of the wagon. The inability to effectively mitigate moisture-related issues jeopardizes both the occupants' health and the structural integrity and durability of the wagon.

In addition, constructing, maintaining, and repairing bathrooms within a permanently attached structure is a cumbersome and labor-intensive process. The fixed nature of prior bathroom installations in wagons makes repairs and maintenance tasks exceedingly complex and expensive. Any necessary repairs to plumbing, fixtures, or infrastructure often required dismantling significant portions of the wagon's interior or even the entire bathroom, resulting in significant downtime and disruption to the functionality and aesthetics of the wagon. This inherent inconvenience and difficulty in maintaining and repairing these structures underscores the need for a more flexible and efficient approach to providing bathroom facilities in covered wagons.

Therefore, in view of these problems, and others, it would be useful to provide a wagon with a bathroom module, as well as a standalone bathroom module.

BRIEF SUMMARY

Examples extend to wagons with a bathroom module, as well as standalone bathroom modules.

A wagon includes a chassis. One or more axles are attached to one side (e.g., the underside) of the chassis and each axle includes one or more attached wheels. A flooring surface is attached to another side (e.g., the upper side) of the chassis. A first side surface is attached at or near a longitudinal edge of the flooring surface. A second side surface is attached at or near another and opposing longitudinal edge of the flooring surface.

A plurality of (e.g., exterior) canopy frame supports (e.g., arches or bows) are attached to the first side surface and the second side surface and span between the first side surface and second side surface. Another plurality of (e.g., interior) canopy frame supports (e.g., also arches or bows) are also attached to the first side surface and the second side surface and span between the first side surface and second side surface. Canopy frame supports included in the plurality of (e.g., exterior) canopy frame supports can be larger than canopy frame supports included in the other plurality of (e.g., interior) frame supports.

An exterior canopy can rest on the plurality of (e.g., exterior) canopy frame supports, span between the plurality of canopy frame supports, and span between the first side surface and the second side surface. An interior canopy can rest on the other plurality of (e.g., interior) canopy frame supports, span between the other plurality of canopy frame supports, and span between the first side surface and the second side surface.

The wagon can also include a variety of systems, such as a water system, a gas system, an electrical system, an A/C system, a heat system, and a sewer system. In one aspect, a removable bathroom module can be placed on the flooring surface of the wagon to integrate with these systems of the wagon to provide a sink, shower (or bath), and toilet. In another aspect, a standalone bathroom module can have all of these systems integrated into it.

The bathroom module, whether removable or standalone, includes a base supporting a base flooring surface that is attached to a frame to form an interior of the bathroom. The interior of the bathroom module can further include a light, sink, toilet, shower (or bath), A/C fan, water heater, and heat vent. Additionally, the bathroom module can include a protective layer on the exterior of the bathroom module, as well as an exhaust fan to assist in the management of moisture that may build up on the interior. The protective layer may be a single-ply membrane, such as thermoplastic polyolefin (TPO), ethylene propylene diene monomer (EPDM), polyvinyl chloride (PVC). Alternatively, the protective layer may consist of multiple layers of material. Additionally, the bathroom module can include a reinforcement frame and one or more attachment points, such a D-rings, to support movement of the bathroom module.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of scope, implementations will be described and explained with additional specificity and detail through the use of the accompanying drawings in which.

DETAILED DESCRIPTION

Figure 1A:
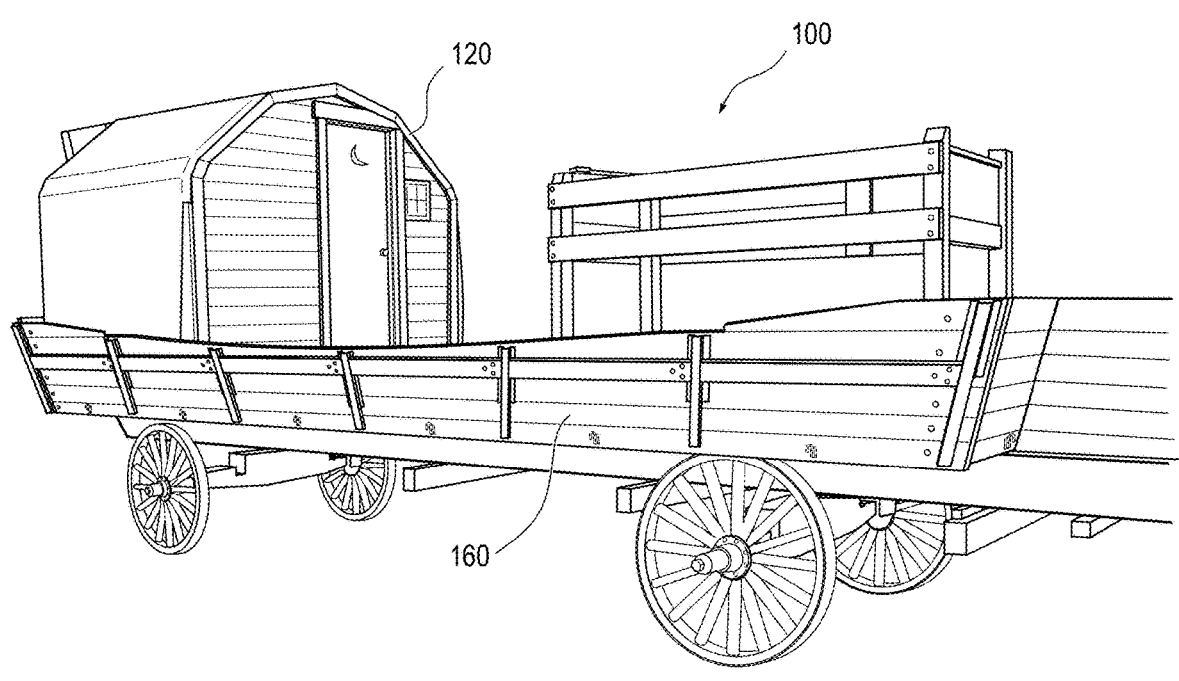
FIG. 1A illustrates an example view of a side of a wagon with a bathroom module.

Examples extend to wagons with a bathroom module, as well as standalone bathroom modules.

When enjoying the great outdoors, individuals often seek a balance between the ruggedness of nature and modern comforts. This desire for balance has given rise to the trend of glamorous camping, or "glamping," where the romance of rustic accommodations converges with the necessity for essential services like bathrooms. Thus, even when opting for unconventional lodging, such as a covered wagon, individuals appreciate having access to well-appointed bathrooms. Such facilities allow individuals to better enjoy the outdoor environment and underline the idea that embracing nature doesn't require the sacrifice of contemporary conveniences.

A wagon can include a chassis. In one aspect, the chassis includes first and second longitudinal joists and a plurality of cross beams running between the first and second longitudinal joists. An area between the first and second longitudinal joists can be utilized as a utility channel. Wires, pipes, conduits, etc. can be run through the utility channel to different parts of the wagon.

One or more axles are attached to one side (e.g., the underside) of the chassis and each axle includes one or more attached wheels.

A flooring surface is attached to another side (e.g., the upper side) of the chassis. The flooring surface can be constructed from a plurality of planks and/or other pieces of material. The planks and/or other pieces of material can include wood, metal, plastic, composite materials, etc.

A first side surface is attached at or near a longitudinal edge of the flooring surface. A second side surface is attached at or near another and opposing longitudinal edge of the flooring surface. The first and second side surfaces can be constructed from a plurality of planks and/or other pieces of material. The planks and/or other pieces of material can include wood, metal, plastic, composite materials, etc. The first and second side surfaces can be constructed of the same materials used to construct the flooring surface or can be constructed of different materials.

A plurality of (e.g., exterior) canopy frame supports (e.g., arches or bows) are attached to the first side surface and the second side surface and span between the first side surface and second side surface. Another plurality of (e.g., interior) canopy frame supports (e.g., also arches or bows) are also attached to the first side surface and the second side surface and span between the first side surface and second side surface. Canopy frame supports included in the plurality of (e.g., exterior) canopy frame supports can be larger than canopy frame supports included in the other plurality of (e.g., interior) frame supports. In one aspect, canopy frame supports are constructed from metal.

An exterior canopy can rest on the plurality of (e.g., exterior) canopy frame supports, span between the plurality of canopy frame supports, and span between the first side surface and the second side surface. An interior canopy can rest on the other plurality of (e.g., interior) canopy frame supports, span between the other plurality of canopy frame supports, and span between the first side surface and the second side surface. In one aspect, canopies are constructed from canvas. Canvas used for canopies can be designed for and/or treated to provide mold resistance or other properties that improve usability, reduce maintenance, or increase durability.

The wagon can also include a variety of systems, such as a water system, a gas system, an electrical system, an A/C system, a heat system, and a sewer system. In one aspect, a removable bathroom module can be placed on the flooring surface of the wagon to integrate with these systems of the wagon to provide a sink, shower (or bath), and toilet. In another aspect, a standalone bathroom module can have all of these systems integrated into it.

The bathroom module, whether removable or standalone, includes a base supporting a base flooring surface that is attached to a frame to form an interior of the bathroom. The interior of the bathroom module can further include a light, sink, toilet, shower (or bath), A/C fan, water heater, and heat vent. Additionally, the bathroom module can include a protective layer on the exterior of the bathroom module, as well as an exhaust fan to assist in the management of moisture that may build up on the interior. The protective layer may be a single-ply membrane, such as thermoplastic polyolefin (TPO), ethylene propylene diene monomer (EPDM), polyvinyl chloride (PVC). Alternatively, the protective layer may consist of multiple layers of material. Additionally, the bathroom module can include a reinforcement frame and one or more attachment points, such a D-rings, to support movement of the bathroom module.

FIG. 1A illustrates an example view of a side of a wagon with a bathroom module 100. As depicted, wagon 160 includes various elements of the covered wagon described in U.S. Pat. No. 11,053,076 ("the '076 patent"), which is incorporated by reference herein. For example, wagon 160 includes a chassis with a pair of axles attached to the side of the chassis and wheels attached to each of the axles. Wagon 160 also includes a flooring surface attached to another side of the chassis, as well as first and second side surfaces attached to opposite edges of the flooring surface and running longitudinally along the length of wagon 160. It should be appreciated that, for the sake of clarity, FIG. 1A shows wagon 160 without the installation of interior and exterior canopy frame supports and interior and exterior canopies, as disclosed by the '076 patent.

FIG. 1A further depicts that wagon 160 includes a bathroom module 120. Bathroom module 120 is installed on the flooring surface of wagon 160 proximate the front end of wagon 160 and between the first side surface and the second side surface of wagon 160. Bathroom module 120 and the components therein connect to, and integrate with, one or more systems provided by wagon 160 or other external sources as further described below. In one or more alternative implementations, bathroom module 120 may be installed in other locations within the interior of wagon 160, such as in the middle or near the rear of wagon 160. Alternatively, in other implementations bathroom module 120 may be standalone.

Figure 1B:
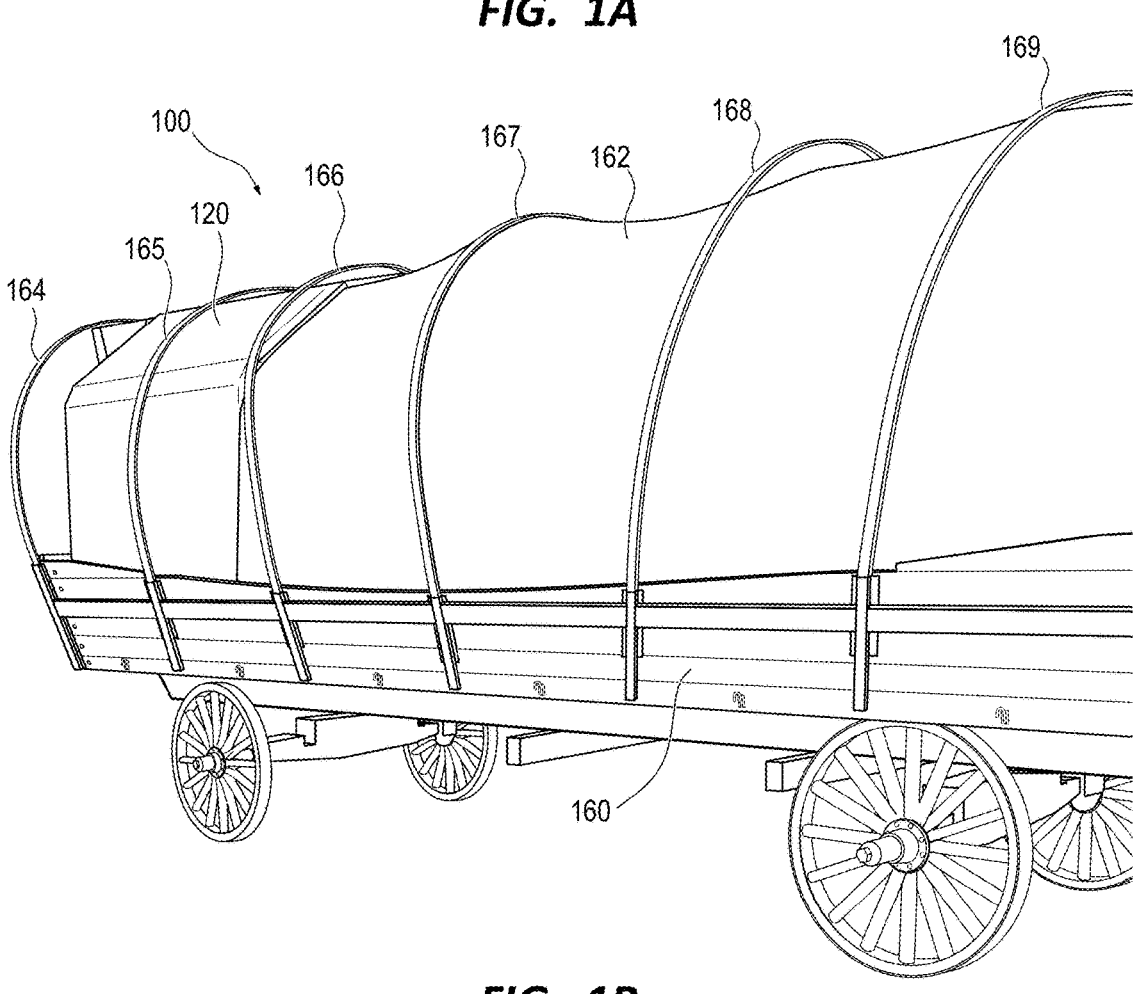
FIG. 1B illustrates another example view of the wagon and the bathroom module of FIG. 1A including an interior canopy and a plurality of external canopy frame supports.

FIG. 1B illustrates another example view of the wagon and the bathroom module 100 of FIG. 1A including an interior canopy 162 and a plurality of external canopy frame supports 164, 165, 166, 167, 168, and 169 upon which an exterior canopy (not shown) can be installed. Interior canopy 162 is installed over a plurality of interior canopy frame supports that span from the first side surface to the second side surface as described in the '076 patent. More specifically, FIG. 1B shows that wagon 160 does not include interior canopy frame supports around bathroom module 120 between the portions of the first and second side surfaces where bathroom module 120 is placed. Additionally, FIG. 1B depicts that interior canopy 162 only partially spans the interior of wagon 160 and does not run the full length of the interior of wagon 160. In the implementation shown by FIG. 1B, the interior canopy frame support that pairs with exterior canopy frame support 166 lines up flush with the rear end of bathroom module 120 to provide a contiguous and enclosed interior to wagon 160. In one or more alternative implementations, interior canopy 162 may span the full length of the interior of wagon 160, thereby covering bathroom module 120. In such alternative implementations, the portion of interior canopy 162 that covers bathroom module 120 may be installed directly over the exterior of bathroom module 120 or interior canopy frame supports can be installed over bathroom module 120 to which interior canopy 162 then attaches to or rests upon.

Figure 1C:
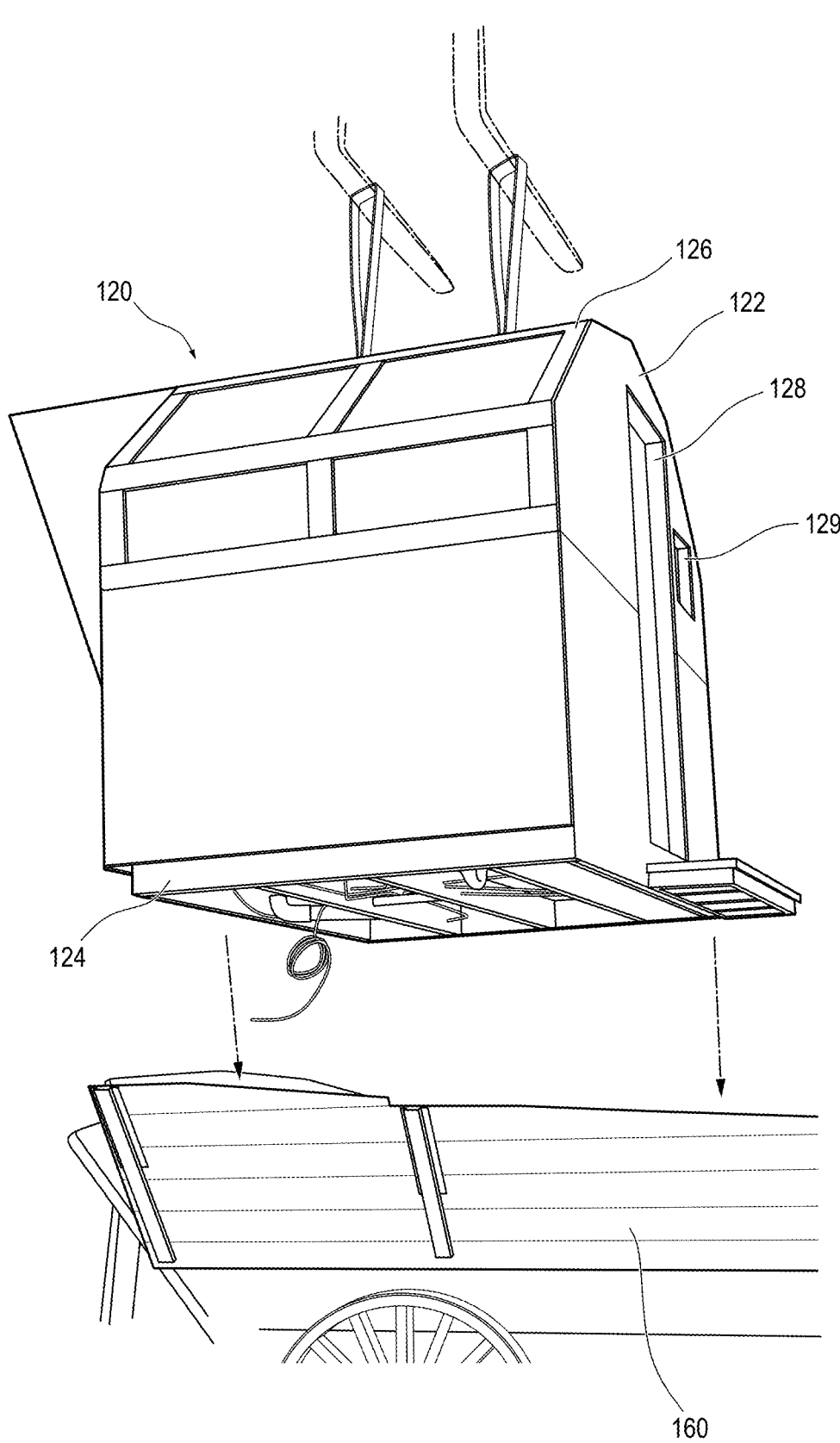
FIG. 1C illustrates an example view of the bathroom module of FIG. 1A.

FIG. 1C illustrates an example view of the bathroom module 120 of FIG. 1A. As shown, bathroom module 120 includes frame 122 attached to base 124 to form an enclosed structure or shelter. Frame 122 is includes a plurality of vertical support members, such as studs, attached to exterior sheets, such as plywood. Along similar lines, base 124 includes a base frame and one or more joists upon which a base flooring surface rests. Bathroom module 120 further includes functional components such as a water heater, light, exhaust fan, A/C fan (i.e. bathroom air handler), heat vent, sink, shower (or bath), and toilet. Thus, base 124 can include one or more connections configured to couple these functional components to systems of wagon 160 or external sources, as further described herein.

FIG. 1C also shows bathroom module 120 further includes reinforcement frame 126. Reinforcement frame 126 can be made of steel, other metal, or any other material that provides enhanced rigidity and structural integrity of bathroom module 120. Additionally, reinforcement frame 126 can include one or more attachment points that facilitate the movement of bathroom module 120, such as during the installation or removal of bathroom module 120 from wagon 160 or movement of a standalone version of bathroom module 120. FIG. 1C also shows bathroom module 120 includes a door 128 and a rear window 129. Door 128 is used to access the interior of bathroom module 120.

Figure 1D:
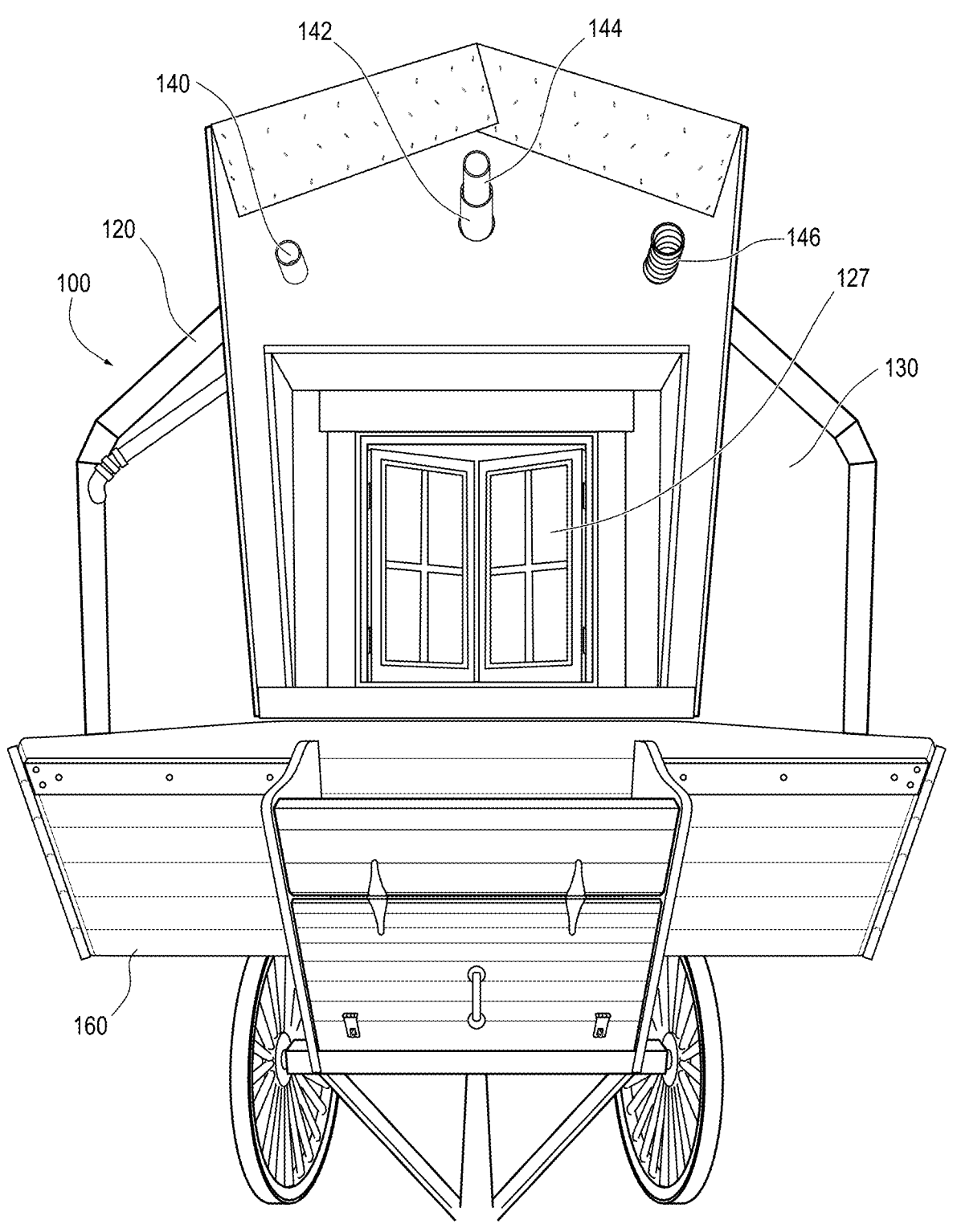
FIG. 1D illustrates an example view of a front end of the wagon and the bathroom module of FIG. 1A including a protective layer on the exterior of the bathroom module.

FIG. 1D illustrates an example view of a front end of the wagon and the bathroom module 100 of FIG. 1A including a protective layer 130 on the exterior of bathroom module 120. As depicted, bathroom module 120 also includes plumbing vent 140, water heater intake 142, water heater exhaust 144, and exhaust fan vent 146. Each of plumbing vent 140, water heater intake 142, water heater exhaust 144, and exhaust fan vent 146 consist of conventional conduit, piping, or ducting, and are built into frame 122 of bathroom module 120. Plumbing vent 140 regulates the air pressure of the plumbing of bathroom module 120, while water heater intake 142 provides air intake to a water heater in bathroom module 120, and water heater exhaust 144 allows for the dissipation of exhaust from the water heater within bathroom module 120. Exhaust fan vent 146, in conjunction with an exhaust fan, moves air, which may be humid, from inside bathroom module 120 to outside bathroom module 120.

As further shown by FIG. 1D, the front end of bathroom module 120 includes front window 127. Protective layer 130, exhaust fan vent 146, and front window 127 assist in the management of moisture that may build up within bathroom module 120 when, for example, the shower is used. Thus, protective layer 130 creates a waterproof seal around the exterior of bathroom module 120 so that moisture is handled within bathroom module 120 in a manner that does not lead to deterioration of bathroom module 120.

More specifically, protective layer 130 facilitates moving moisture out of bathroom module 120 through exhaust fan vent 146 and window 127, as those may be the only routes of egress for humid air from bathroom module 120.

Figure 1E:
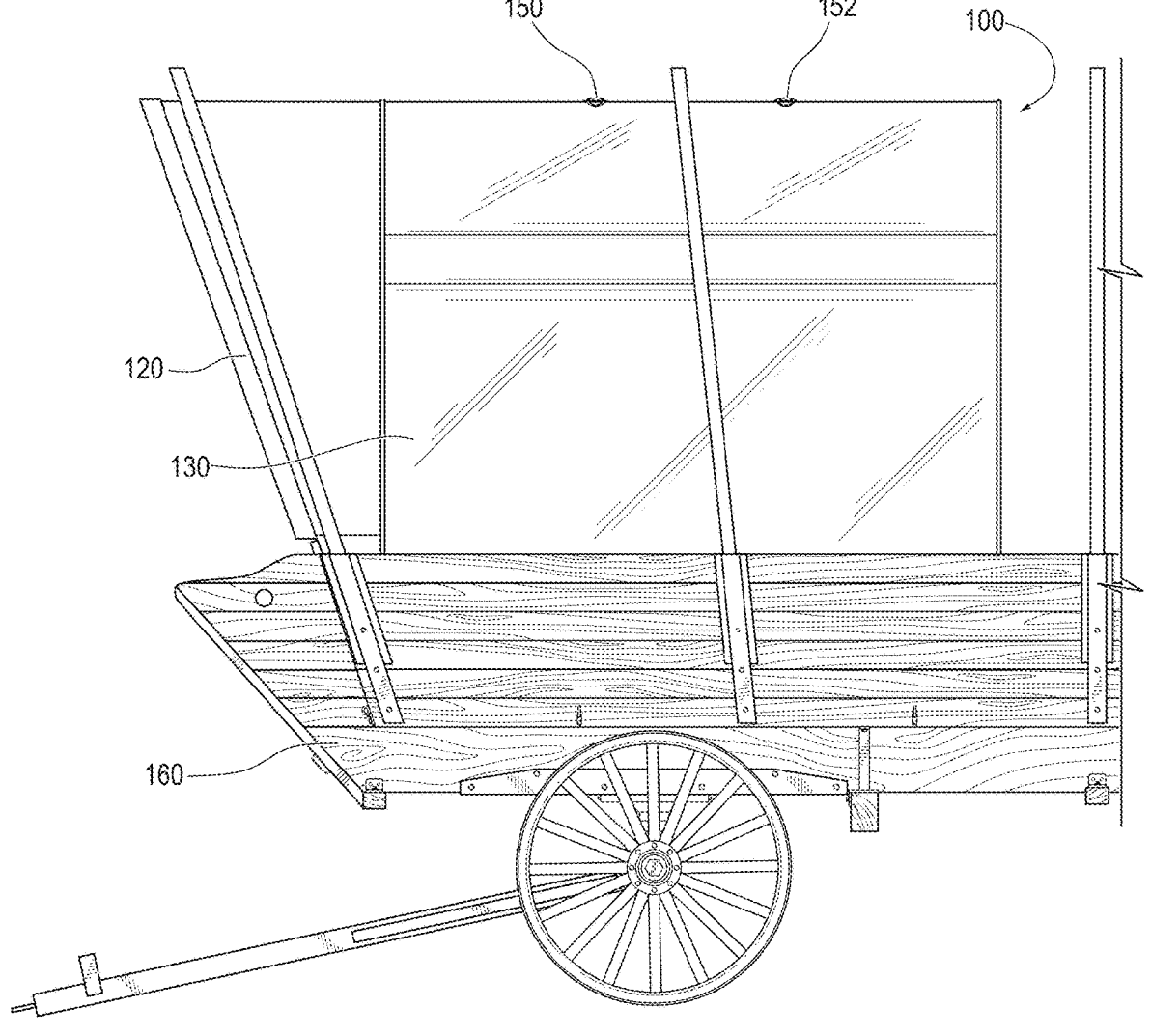
FIG. 1E illustrates an example view of a side of the front end of the wagon and the bathroom module of FIG. 1A including the protective layer on the exterior of the bathroom module.

FIG. 1E illustrates an example view of a side of the front end of the wagon and the bathroom module 100 of FIG. 1A including the protective layer 130 on the exterior of the bathroom module 120. Protective layer 130 is a waterproof material that assists in the management of moisture to prevent damage to bathroom module 120 and wagon 160. For example, protective layer 130 can be thermoplastic polyolefin (TPO), ethylene propylene diene monomer (EPDM), polyvinyl chloride (PVC), or any other suitable material that exhibits waterproof or sufficiently water-resistant qualities. Moreover, protective layer 130 can consist of one or more layers that attach to the exterior of bathroom module 120.

Figure 1F:
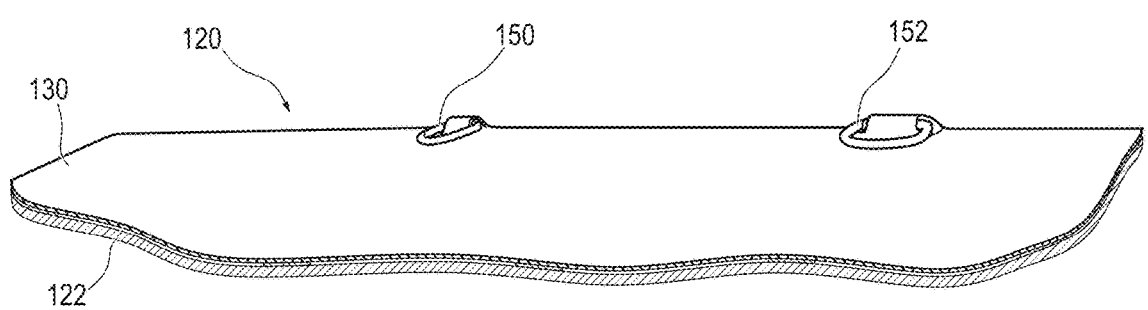
FIG. 1F illustrates an example view of attachment points on the bathroom module of FIG. 1A.

FIG. 1F illustrates an example view of attachment points 150 and 152 on the bathroom module 120 of FIG. 1A. As depicted, attachment points 150 and 152 are D-rings that are integrated into reinforcement frame 126 of bathroom module 120. Attachment points 150 and 152 can be used to move bathroom module into and out of wagon 160, for example, by using a forklift, crane, or other heavy machinery that connects to attachment points 150 and 152 to raise and lower bathroom module 120.

Figure 1G:
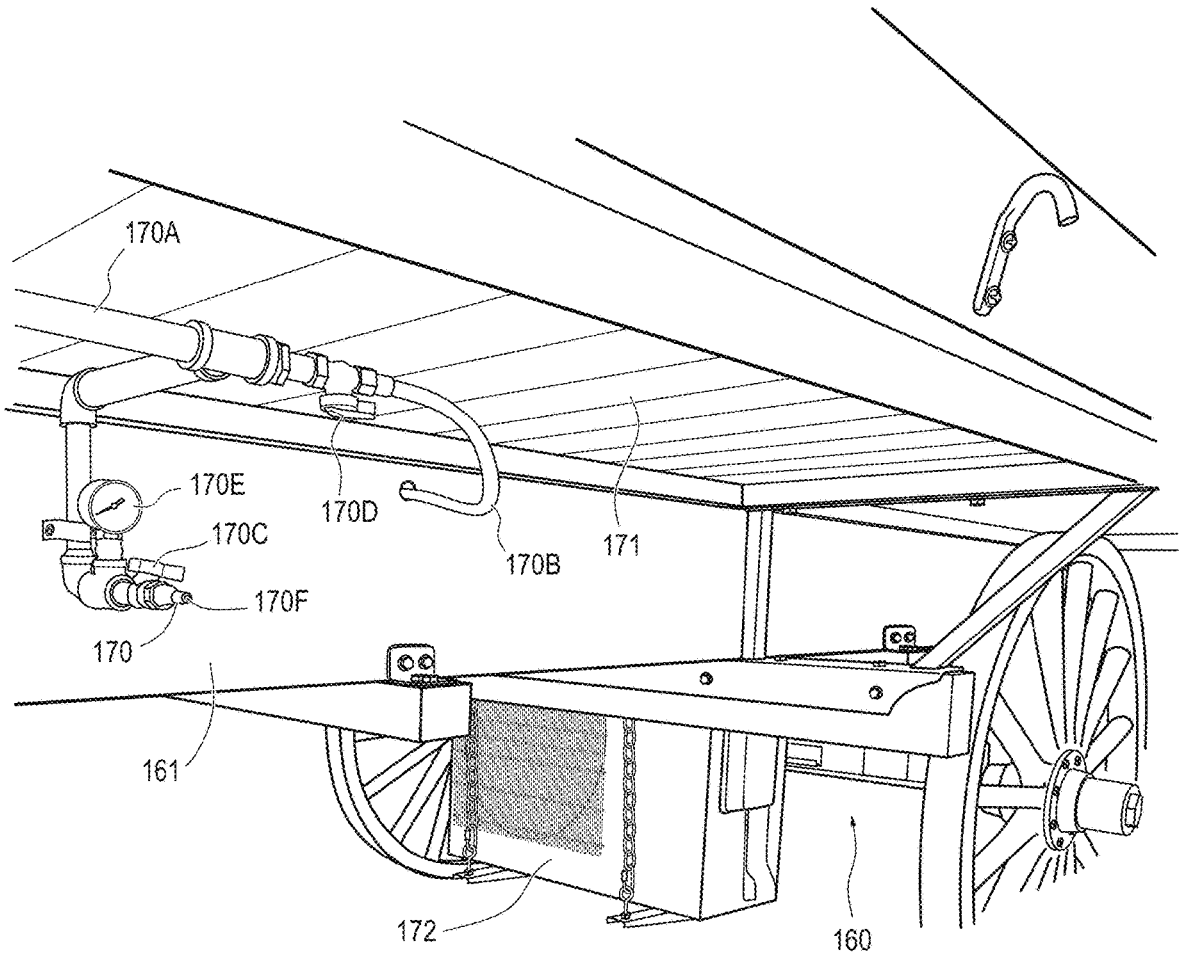
FIG. 1G illustrates an example view of the chassis of the wagon of FIG. 1A beneath the flooring surface of the wagon including a gas system and an air conditioning system.

FIG. 1G illustrates an example view of the chassis 161 of the wagon 160 of FIG. 1A beneath the flooring surface 171 of the wagon 160 including a gas system 170 and A/C system 172. Gas system 170 includes gas connection point 170F, main gas valve 170C, gas gauge 170E, gas water heater conduit 170A, heater conduit 170B, and heater gas valve 170D. Gas system 170 uses gas connection point 170F to connect to an external gas source, such as propane or liquefied petroleum (LP-gas or LPG), to provide gas service to wagon 160 and bathroom module 120. Main gas valve 170C is used to selectively turn on and off the gas supply to wagon 160 and bathroom module 120 as a whole, whereas heater gas valve 170D is used to selectively turn on and off the gas supply to a heater (e.g. furnace) through heater conduit 170B. The heater (not shown) can be mounted within the chassis 161 of wagon 160, while A/C system 172, as shown, includes a compressor/condenser of a mini split air conditioner mounted beneath chassis 161.

Figure 1H:
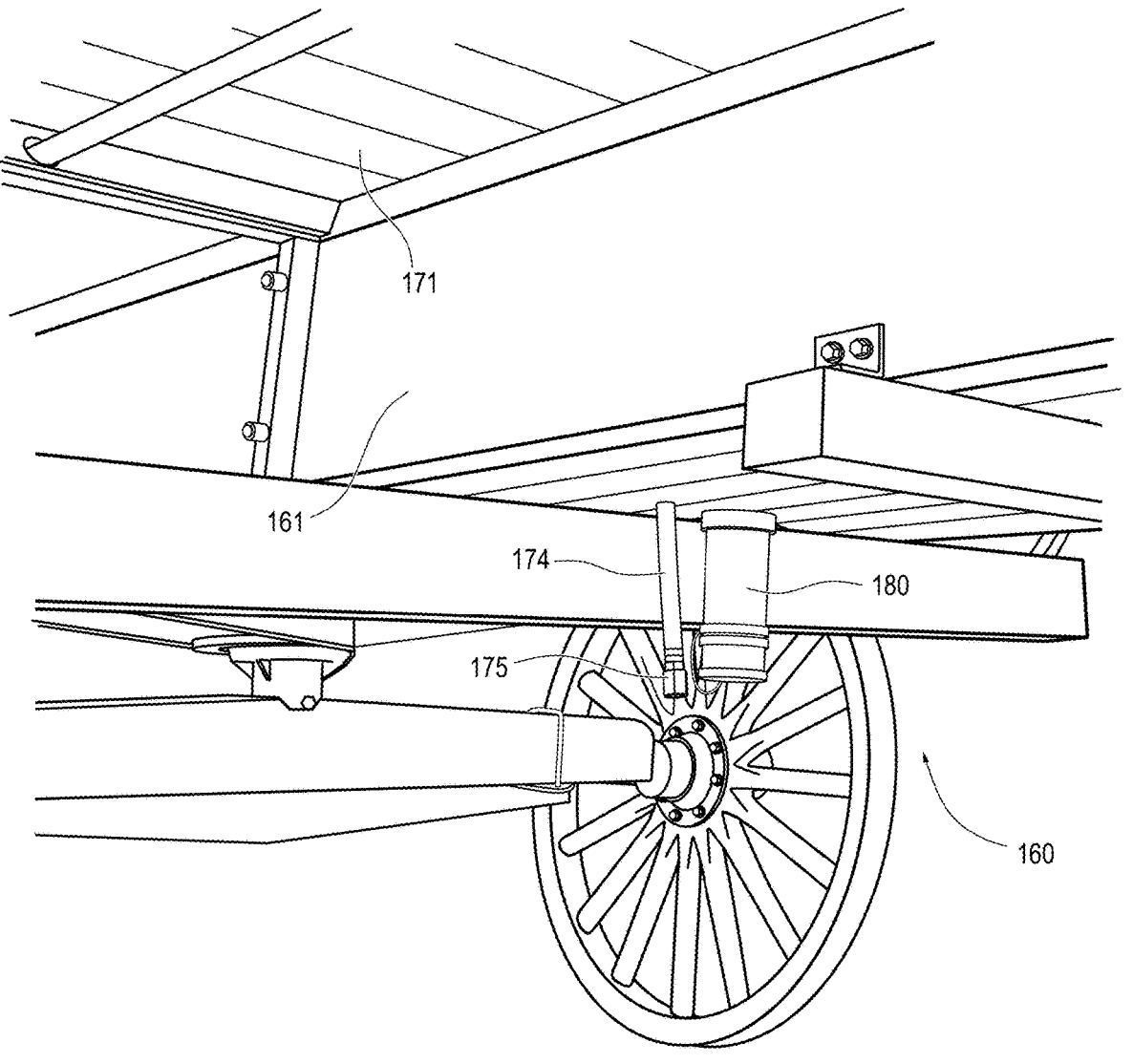
FIG. 1H illustrates an example view of the chassis of the wagon of FIG. 1A beneath the flooring surface of the wagon including a water system and a sewer system.

FIG. 1H illustrates an example view of the chassis 161 of the wagon 160 of FIG. 1A beneath the flooring surface 171 of the wagon 161 including a water system 174 and a sewer system 180. Water system 174 includes conduit with a connection point 175. The water conduit runs within the channel of chassis 161 to couple with bathroom module 120. Water connection point 175 connects to an external water source, such as municipal water or a water tank, to provide water to the wagon 160 and bathroom module 120. Sewer system 180 connects to an external sewer service, such as a municipal sewer or septic tank. Sewer system 180 consists of conduit that runs within the channel of chassis 161 to couple with bathroom module 120 to provide egress for wastewater and other material that drains out of bathroom module 120, as further described herein.

Figure 1I:
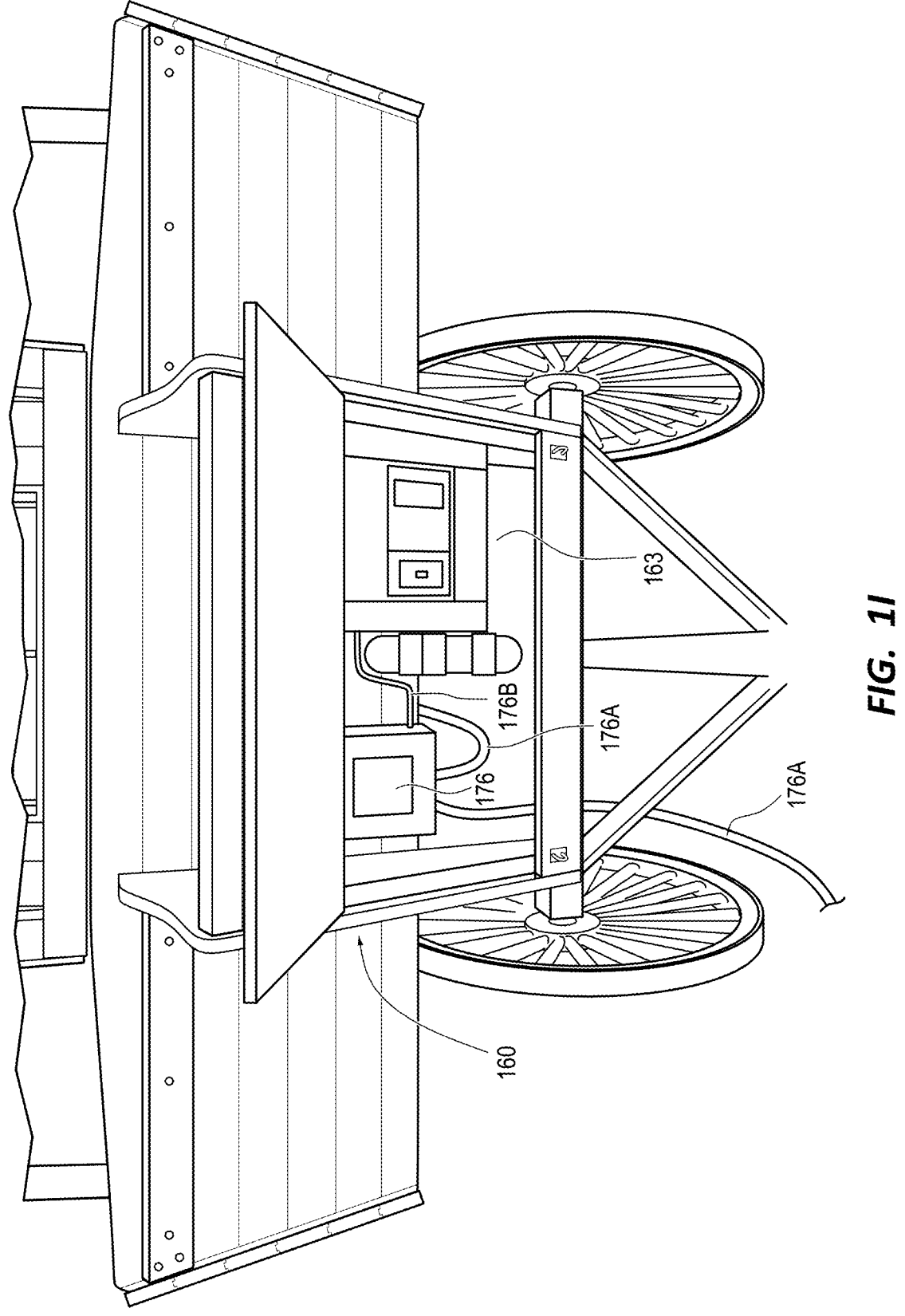
FIG. 1I illustrates an example view of the front end of the wagon of FIG. 1A including an electrical system and a channel beneath the flooring surface of the wagon of FIG. 1A.

FIG. 1I illustrates an example view of the front end of the wagon 160 of FIG. 1A including an electrical system 176 and a channel 163 beneath the flooring surface of the wagon 160 of FIG. 1A. The channel 163 is formed by the chassis 161 of wagon 160, as described in the '076 patent. Electrical system 176 connects to an external electrical source, such as an electrical power grid, through electrical hookup wiring 176A. Electrical system 176 also connects to components of wagon 160 and bathroom module 120 that need electricity through electrical distribution wiring 176B which runs within channel 163. Examples of components that may use electricity provided by electrical system 176 include an A/C system, heating system (e.g. a furnace), water heater (e.g. a tankless water heater), lights, exhaust fans, A/C fans (i.e. air handlers, such as a bathroom air handler), and power outlets.

Figure 1J:
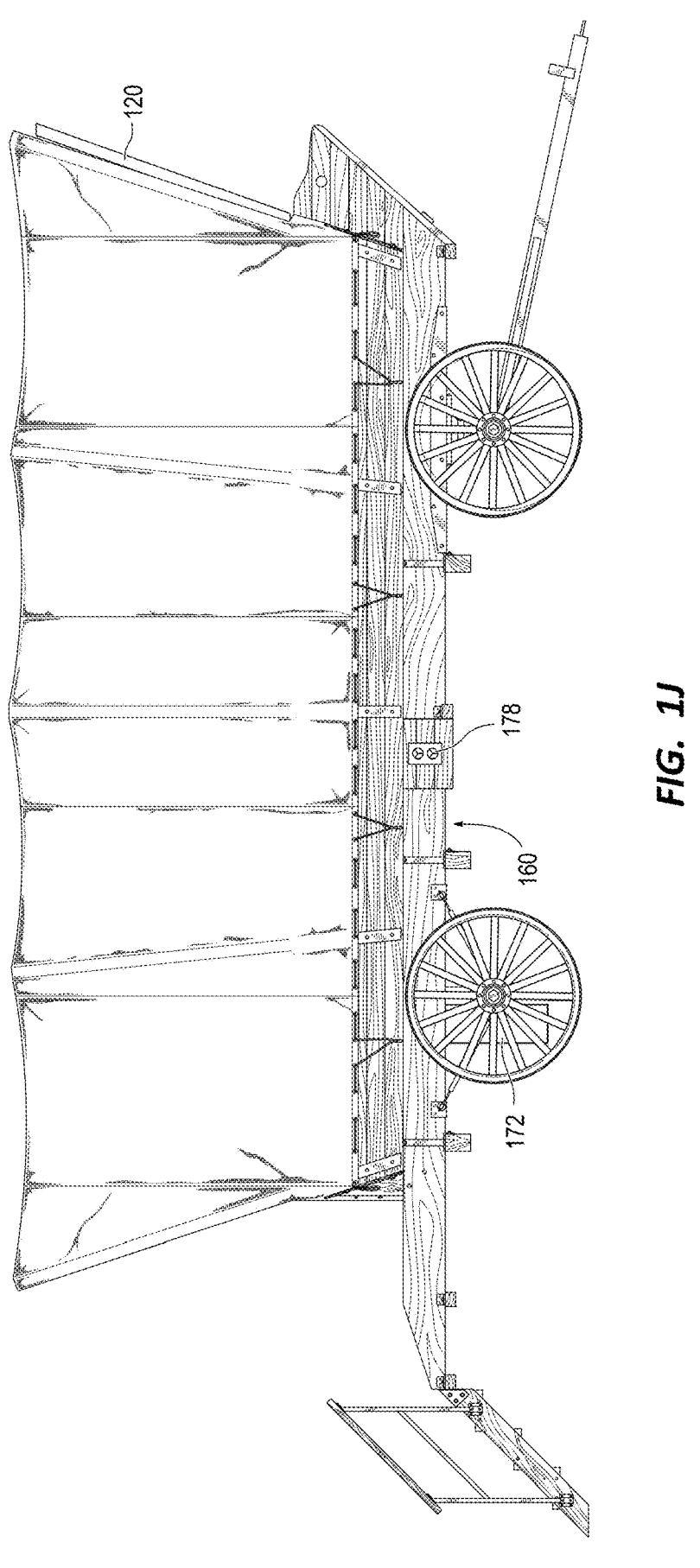
FIG. 1J illustrates an example view of another side of the wagon of FIG. 1A including a heating system.

FIG. 1J illustrates an example view of another side of the wagon 160 of FIG. 1A including a heating system 178. Heating system 178 includes a heater (e.g. furnace) mounted inside the channel 163 formed by chassis 161 of wagon 160. Heating system 178 further may further include a heat intake/exhaust vent for the heater.

Figure 1K:
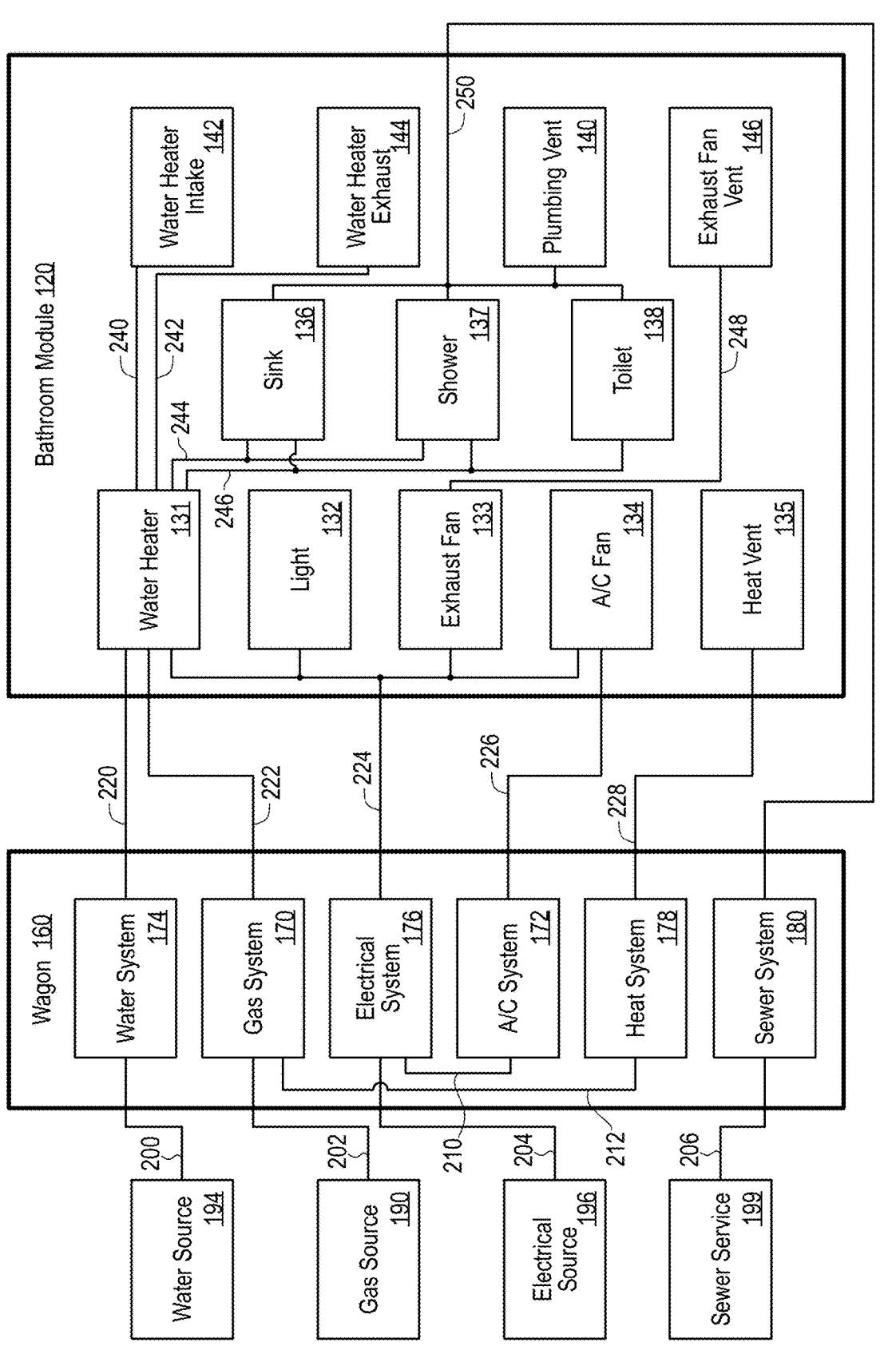
FIG. 1K illustrates a schematic diagram of systems of the wagon and components of the bathroom module of FIG. 1A including the connections therebetween and external sources and services that support those systems and components.

FIG. 1K illustrates a schematic diagram of systems of the wagon 160 and components of the bathroom module 120 of FIG. 1A including the connections therebetween and external sources and services 190, 194, 196, and 206 that support those systems and components. As depicted, wagon 160 includes water system 174, gas system 170, electrical system 176, A/C system 172, heating system 178, and sewer system 180. The systems of wagon 160 are connected to various corresponding external sources and services, including water source 194, gas source 190, electrical source 196, and sewer service 199. Furthermore, the systems of wagon 160 are connected to various components of bathroom module 120, such as water heater 131, light 132, exhaust fan 133, A/C fan (i.e. bathroom air handler) 134, and heat vent 135. In addition, bathroom module 120 includes a sink 136, shower 137, and toilet 138, as well as water heater intake 142, water heater exhaust 144, plumbing vent 140 and exhaust fan vent 146.

As further shown by FIG. 1K, water system 174 of wagon 160 connects to external water source 194 through conduit 200 to provide water to water heater 131 of bathroom module 120 through conduit 220. Conduit 220 may run through channel 163 of chassis 161 of wagon 160, as well as into bathroom module 120 to meet with water heater 131. Water heater 131 takes in air from outside bathroom module 120 through conduit 240 connected to water heater intake 142 and expels exhaust outside bathroom module 120 through conduit 242 connected to water heater exhaust 144. Additionally, water heater 131 provides hot water through conduit 244 to both sink 136 and shower 137. Along similar lines, water heater 131 provides cold water through conduit 246 to sink 136, shower 137, and toilet 138. Sink 136, shower 137, and toilet 138 expel wastewater and other material through conduit 250 back to sewer system 180 of wagon 160, which ultimately leads to external sewer service 199 through conduit 206. Also, sink 136, shower 137, and toilet 138 are connected to plumbing vent 140 through conduit 250 to manage the pressure of the plumbing in bathroom module 120.

FIG. 1K also shows gas system 170 of wagon 160 connects to external gas source 190 through conduit 202 to provide gas to water heater 131 through conduit 222 and to heating system 178 of wagon 160 through conduit 212. Furthermore, FIG. 1K depicts that electrical system 176 of wagon 160 connects to external electrical source 196 through wiring 204 to provide electricity through wiring 224 to water heater 131, light 132, exhaust fan 133, and A/C fan (i.e. bathroom air handler) 134. As also shown, electrical system 176 provides electricity through wiring 210 to air conditioning system (A/C system) 172. Air conditioning system (A/C system) 172 then provides climate controlled air through conduit 226 to A/C fan (i.e. bathroom air handler) 134 of bathroom module 120. Along similar lines, FIG. 1K also illustrates heating system 178 of wagon 160 connects to gas system 170 through conduit 212 to provide climate controlled air through conduit 228 to heat vent 135 of bathroom module 120.

Given the foregoing, it should be appreciated that bathroom module 120 can be selectively installed or removed in wagon 160 as desired. Additionally, it should also be appreciated that bathroom module 120 can include additional bathroom amenities such as power outlets, bidets, bathtubs, and radiant heated flooring, among others. Furthermore, it should be appreciated that the systems used by bathroom module 120 may in one aspect be distributed between bathroom module 120 and wagon 160 and in another aspect, when bathroom module 120 is standalone, all such systems may be housed within bathroom module 120 such that bathroom module 120 connects directly with external sources and services without the need to be integrated with wagon 160.

The presently described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A wagon comprising:
a chassis;
one or more axles attached to a side of the chassis;
one or more wheels attached to each of the one or more axles;
a flooring surface attached to another side of the chassis;
a first side surface attached to the flooring surface near a flooring surface edge;
a second side surface attached to the flooring surface near another flooring surface edge opposing the flooring surface edge;
an exterior canopy frame support attached to the first side surface and the second side surface and spanning between the first side surface and the second side surface;
a canopy resting on the exterior of the exterior canopy frame support and spanning between the first side surface and the second side surface;
an air conditioning system including:
a compressor/condenser mounted to the chassis below the flooring surface;
an air handler mounted above the flooring surface and under the canopy; and
an air conduit connecting the compressor/condenser and the air handler;
a heating system including:
a heater mounted to the chassis below the flooring surface; and
a heat intake/exhaust vent connected to the heater;
a water system including:
a water conduit mounted to the chassis below the flooring surface;
a water connector on one end of the water conduit; and another water connector on another end of the water conduit;
a sewer system including:
a sewer conduit mounted to the chassis below the flooring surface;
a sewer connector on one end of the sewer conduit; and
another sewer connector on another end of the sewer conduit; and
a bathroom module including:
a base having a base flooring surface;
an enclosed frame attached to the base and forming an interior, the enclosed frame having a door to facilitate movement to and from the interior;
the interior including:
a light;
a sink, a toilet, and a shower, the sink, toilet, and shower connected to the another sewer connector of the sewer system;
an exhaust fan connected to an exhaust fan vent;
a bathroom air handler connected to the compressor/condenser of the air conditioning system; and
a water heater connected to the water system and the heating system, the water heater further connected to the sink, toilet, and shower, the water heater also further connected to a water heater intake and a water heater exhaust; and
a heat vent connected to the heating system;
a protective layer on an exterior of the enclosed frame;
a reinforcement frame attached to the exterior of the enclosed frame; and
an attachment point integrated into the reinforcement frame.

2. The wagon of claim 1, wherein the heater comprises a propane furnace mounted within a channel formed in the chassis.

3. The wagon of claim 1, wherein the exhaust fan comprises a ceiling fan mounted on a ceiling of the interior of the bathroom module.

4. The wagon of claim 1, wherein the water heater comprises a tankless propane water heater mounted on a wall of the interior of the bathroom module.

5. The wagon of claim 1, wherein the layer comprises a single-ply membrane.

6. The wagon of claim 5, wherein the single-ply membrane comprises one of thermoplastic polyolefin or ethylene propylene diene terpolymer.

7. The wagon of claim 1, wherein the attachment point comprises a D-ring.

8. The wagon of claim 1, further comprising one or more windows.

9. The wagon of claim 1, further comprising a plumbing vent connected to the sink, toilet, and shower.

10. The wagon of claim 1, further comprising another canopy resting on the exterior of an interior canopy frame support and spanning between the first side surface and the second side surface.

* * * * *